O. CROSBY.
FRICTION BRAKE MECHANISM.
APPLICATION FILED NOV. 15, 1909.

988,314.

Patented Apr. 4, 1911.
3 SHEETS—SHEET 1.

WITNESSES

INVENTOR
OLIVER CROSBY
BY Paul & Paul
ATTORNEYS

O. CROSBY.
FRICTION BRAKE MECHANISM.
APPLICATION FILED NOV. 15, 1909.
988,314.
Patented Apr. 4, 1911.
3 SHEETS—SHEET 3.
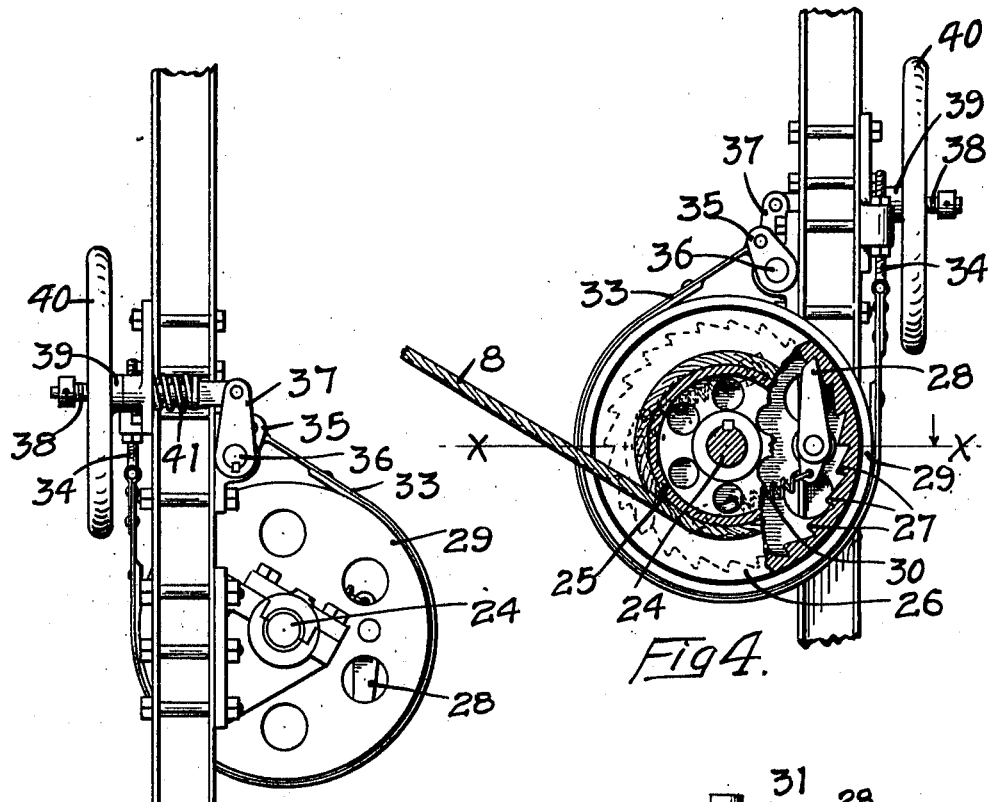
Fig 3.
Fig 4.
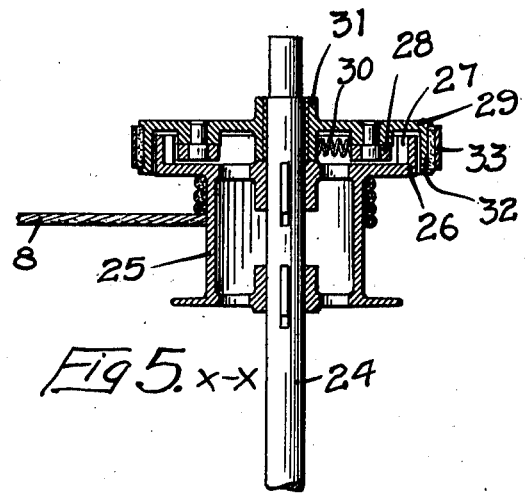
Fig 5.
WITNESSES
INVENTOR
OLIVER CROSBY
BY Paul & Paul
ATTORNEYS

UNITED STATES PATENT OFFICE.

OLIVER CROSBY, OF ST. PAUL, MINNESOTA, ASSIGNOR TO AMERICAN HOIST & DERRICK CO., OF ST. PAUL, MINNESOTA, A CORPORATION.

FRICTION BRAKE MECHANISM.

988,314.  Specification of Letters Patent.  Patented Apr. 4, 1911.

Application filed November 15, 1909. Serial No. 528,224.

*To all whom it may concern:*

Be it known that I, OLIVER CROSBY, of St. Paul, Ramsey county, Minnesota, have invented certain new and useful Improvements in Friction Brake Mechanisms, of which the following is a specification.

In the operation of the boom of a ditching machine or similar apparatus a mechanism is provided for raising and lowering the boom in addition to the means for operating the bucket independently of the boom. It often happens that the operator wishes to swing the boom to a higher elevation to clear some obstruction past which it is desired to swing the boom during the operation of loading or dumping the bucket. A friction brake mechanism is generally employed in connection with the means for raising and lowering the boom and when increased elevation of the boom has been desired it has been necessary to release the brake mechanism.

The object of my present invention is to provide means whereby the operator can raise the boom at any desired point in its oscillation without the necessity of releasing the brake.

Other objects of the invention will appear from the following detailed description.

The invention consists generally in the construction and combination of parts hereinafter referred to and particularly pointed out in the claims.

Figure 1:
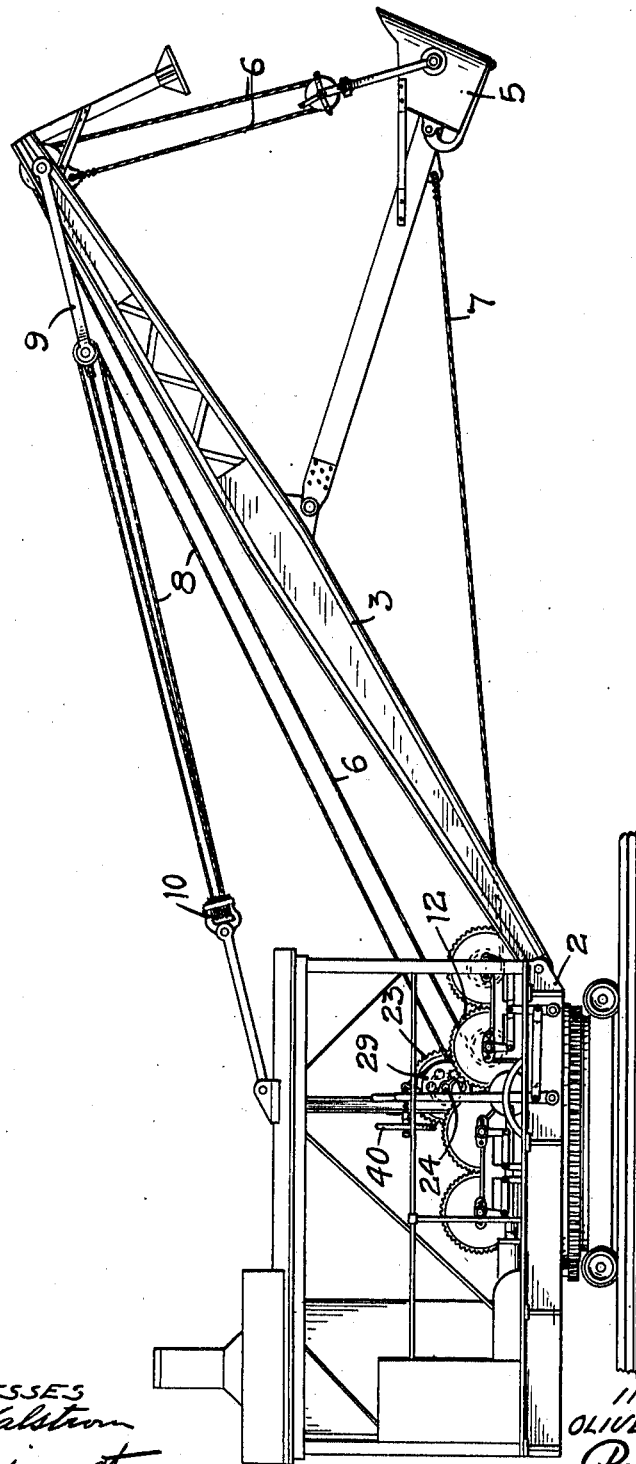
Figure 2:
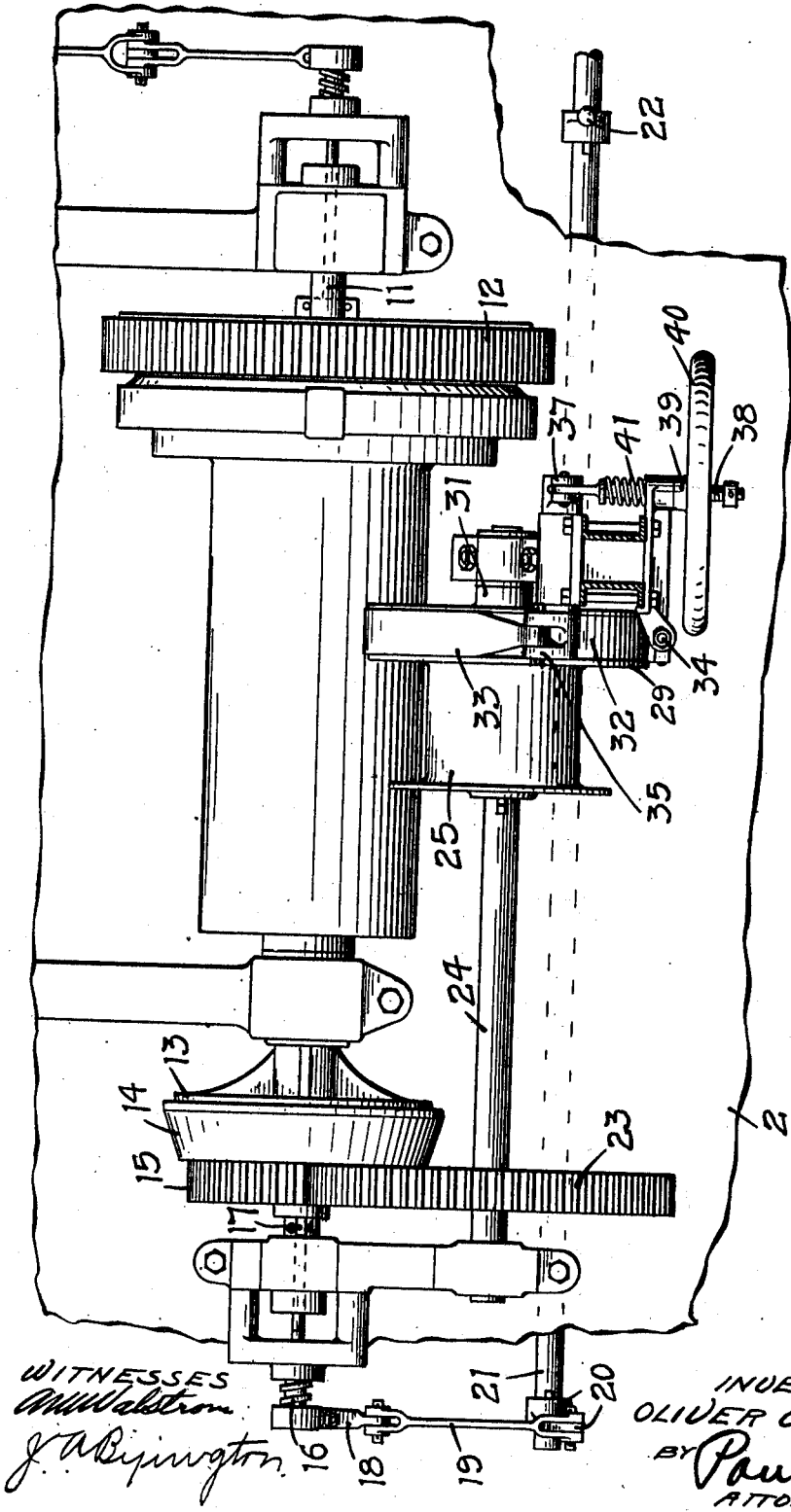

In the accompanying drawings forming part of this specification, Figure 1 is a side elevation of a ditching machine with my invention applied thereto, Fig. 2 is a detail plan view of one of the drums of the machine, showing the strap brake mechanism and the drum on which the boom operating cable is wound, Fig. 3 is a detail view of the brake mechanism, Fig. 4 is a similar view with a portion of the casing of the brake mechanism broken away, illustrating the interior construction, Fig. 5 is a sectional view on the line $x$—$x$ of Fig. 4.

In the drawing, 2 represents a ditching machine, 3 the boom therefor, and 5 a bucket operated by means of cables 6 and 7. 8 is a cable connected to a bail 9 on the end of the boom and to a block 10 that is attached to the frame of the ditcher, these parts being all illustrated in Fig. 1.

Referring to Fig. 2, 11 is a shaft operated continuously from a suitable source of power through a gear 12. 13 is one member of a friction clutch secured on the said shaft and 14 is the other member of the clutch, having a hub provided with a gear 15. This clutch member 14 and the gear 15 are idle on said shaft. 16 is a screw fitting within a socket in the end of the shaft 11 and arranged to engage a pin 17 that is adapted to slide in a transverse slot in said shaft and contact with the hub of the gear 15, forcing it and the clutch member 14 toward the other member 13 when the screw 16 is turned inwardly. An arm 18 is mounted on the end of said screw and connected by a link 19 with a crank 20 that is secured on a shaft 21. This shaft extends transversely of the machine and carries an operating lever 22 within convenient reach of the operator, by means of which the shaft 21 may be rocked and the screw turned inwardly to set the friction clutch in its operative position. The gear 15 meshes with a larger gear 23 on the drum shaft 24 and a drum 25 is keyed on said shaft and around this drum the cable 8 is wound to raise the boom. The drum is provided at one end with an annular flange 26, having interiorly arranged ratchet teeth 27 which are engaged by dogs 28, mounted on a disk 29 and held in engagement with said teeth by springs 30. The disk 29 has a hub 31 loosely mounted on the shaft 24 and turning freely thereon, and said disk is also provided with a peripheral friction surface 32 which is encircled by a friction brake strap 33. One end of this strap is connected to an adjustable screw 34 and the other to a crank 35 mounted on a rock shaft 36. This rock shaft has a crank arm 37 and a pin 38 is pivotally connected to said arm and has a threaded end to receive the interiorly threaded hub 39 of a wheel 40. A spring 41 is arranged on said pin and is put under tension by the turning of the wheel 40 to set said brake. As soon as the wheel is revolved in the opposite direction the tension of the spring will return the rock shaft 36 to its normal position and release the brake strap. The revolution of the shaft 24 will wind the cable on the drum and when the boom has been adjusted to the desired elevation the operator will set the brake strap and the clutch members 13 and 14 may then be disengaged and the boom will be securely held by the brake mechanism. In swinging the boom from point to point, however, it may be desirable to elevate it still farther to clear some obstruction and I accomplish this without loosening the brake strap through the medium of the ratchet mechanism provided in connection with the brake disk. This disk will be held rigidly by the brake strap, but upon throwing in the clutch the drum may be revolved to raise the boom to a higher point, the teeth of the flange 26 of the drum slipping over the dogs and permitting such adjustment of the boom without the necessity of loosening the brake strap or disturbing the brake disk. The operator can thus elevate the boom whenever desired by the simple manipulation of the lever 22, knowing that in whatever position he may adjust the boom it will be held by the brake strap when the clutch mechanism has been thrown to its inoperative position.

I have shown this invention used in connection with a ditching machine, but it is equally applicable for raising the boom of a log loader or locomotive crane, or, in fact, any machine where the lifting of the boom may be desired after the brake is set.

I do not wish to be confined to the ratchet mechanism shown, as this device is capable of considerable modification and still be within the scope of my invention.

I claim as my invention—

1. The combination with a shaft, of a drum secured thereon, and having a ratchet gear, a disk loosely mounted on said shaft, dogs carried by said disk adapted to engage the teeth of said ratchet gear, said disk having a frictional surface, a strap encircling the frictional surface of said disk, a crank connected to one end of said strap carried by a rock shaft, a second arm carried by said rock shaft, a pin pivotally connected to said last mentioned arm provided with a threaded portion, and a wheel having a threaded hub mounted on said pin, said drum revolving in one direction past said dogs to allow the winding of the cable thereon after the brake is set.

2. The combination with a shaft, of a drum secured thereon having an annular flange at one end provided with internal ratchet teeth, a disk loosely mounted on said shaft having a peripheral frictional surface, spring actuated dogs carried by said disk coacting with the teeth of the drum, a frictional brake strap encircling the frictional surface of said disk, an adjustable screw connected to one end of said strap, a crank arm connected to the other end of said strap carried by a rock shaft, a second arm carried by said rock shaft, a pin pivotally connected to said arm provided with a threaded end, a wheel provided with a threaded hub adapted to receive said pin, and a spring surrounding said pin for returning said rock shaft to its normal position.

In witness whereof, I have hereunto set my hand this sixth day of November 1909.

OLIVER CROSBY.

Witnesses:
ELIJAH BAKER,
C. B. MORAN.

---

Copies of this patent may be obtained for five cents each, by addressing the "Commissioner of Patents, Washington, D. C."